United States Patent [19]

Yeh

[11] Patent Number: 5,311,330
[45] Date of Patent: May 10, 1994

[54] DOCUMENT GUIDE ROLLER ASSEMBLY IN A SCANNER

[75] Inventor: Chen-Chi Yeh, Taiwan, Taiwan

[73] Assignee: Silitek Corporation, Taipei, Taiwan

[21] Appl. No.: 987,882

[22] Filed: Dec. 8, 1992

[51] Int. Cl.⁵ .............................................. H04M 1/04
[52] U.S. Cl. ................................. 358/498; 358/496; 358/474
[58] Field of Search ........ 359/896; 358/400, 496-498, 358/474, 471; 355/233, 308; 346/143; H04N 1/00, 1/04

[56] References Cited

U.S. PATENT DOCUMENTS

| | | | |
|---|---|---|---|
| 4,743,974 | 5/1988 | Lockwood | 358/496 |
| 4,970,606 | 11/1990 | Shima | 358/496 |
| 5,072,307 | 12/1991 | Shirakoshi et al. | 358/400 |
| 5,077,618 | 12/1991 | Sakai et al. | 358/496 |
| 5,124,801 | 6/1992 | Shinmura et al. | 358/473 |

Primary Examiner—Edward L. Coles, Sr.
Assistant Examiner—Kim Yen Vu
Attorney, Agent, or Firm—Lowe, Price, LeBlanc & Becker

[57] ABSTRACT

A scanner is disclosed having spring pressers pressed over the axles of a document guide roller assembly of a transmission mechanism thereof at two opposite ends in holding down the document guide roller assembly for delivering the document inserted therein for smooth scanning and preventing the document from being biased.

2 Claims, 6 Drawing Sheets

DOCUMENT GUIDE ROLLER ASSEMBLY IN A SCANNER

BACKGROUND OF THE INVENTION

The present invention relates to a scanners and relates more particularly to a document scanner for use in reading business cards and the like.

People in offices may expend a lot of time in finding the data (name, address, telephone number, etc.) from a set of business cards. By means of the application of the scanning technology, this problem can be solved.

SUMMARY OF THE INVENTION

The present invention provides a scanner which helps people read business cards efficiently. As a business card or like document was inserted in the feed port of the scanner, a spring switch is triggered to drive a scanning control circuit in giving a trigger signal to a motor drive at 2.8 ms after a time delay of 1.43 seconds, thereby causing the motor drive to rotate a document guide roller assembly through a transmission roller assembly via a transmission gear set, for permitting the document to be delivered through the light of a LED light source, and therefore the image of the document is reflected onto a focus lens assembly by a reflector for reading. Spring pressers are fastened to the cover shell of the scanner to hold down the document guide roller assembly for permitting the inserted document to be smoothly moved in the correct direction for high quality scanning.

DETAILED DESCRIPTION OF THE PREFERRED EMBODIMENT

Figure 1:
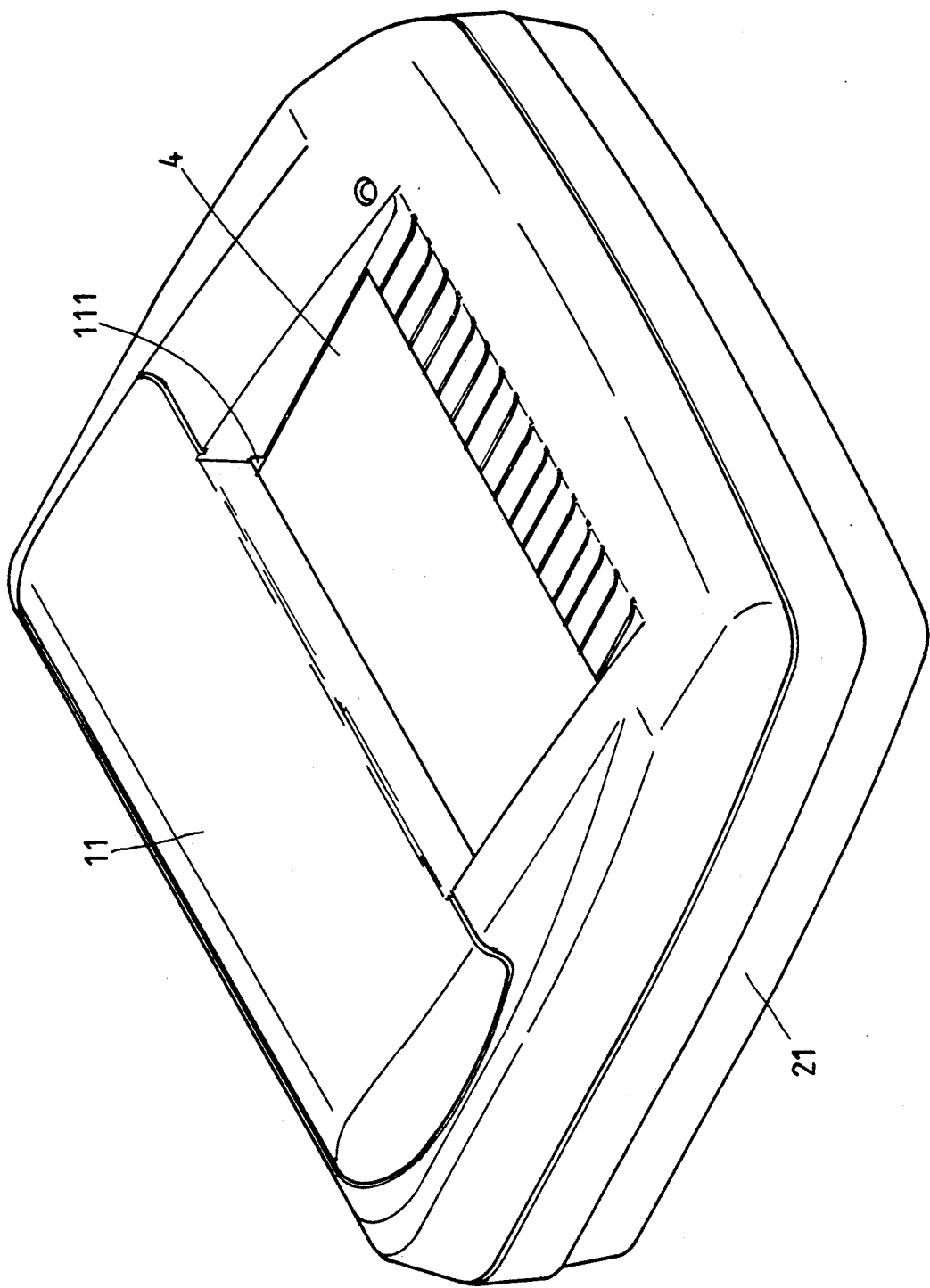
FIG. 1 is an elevational view of a scanner according to the present invention.
Figure 2A:
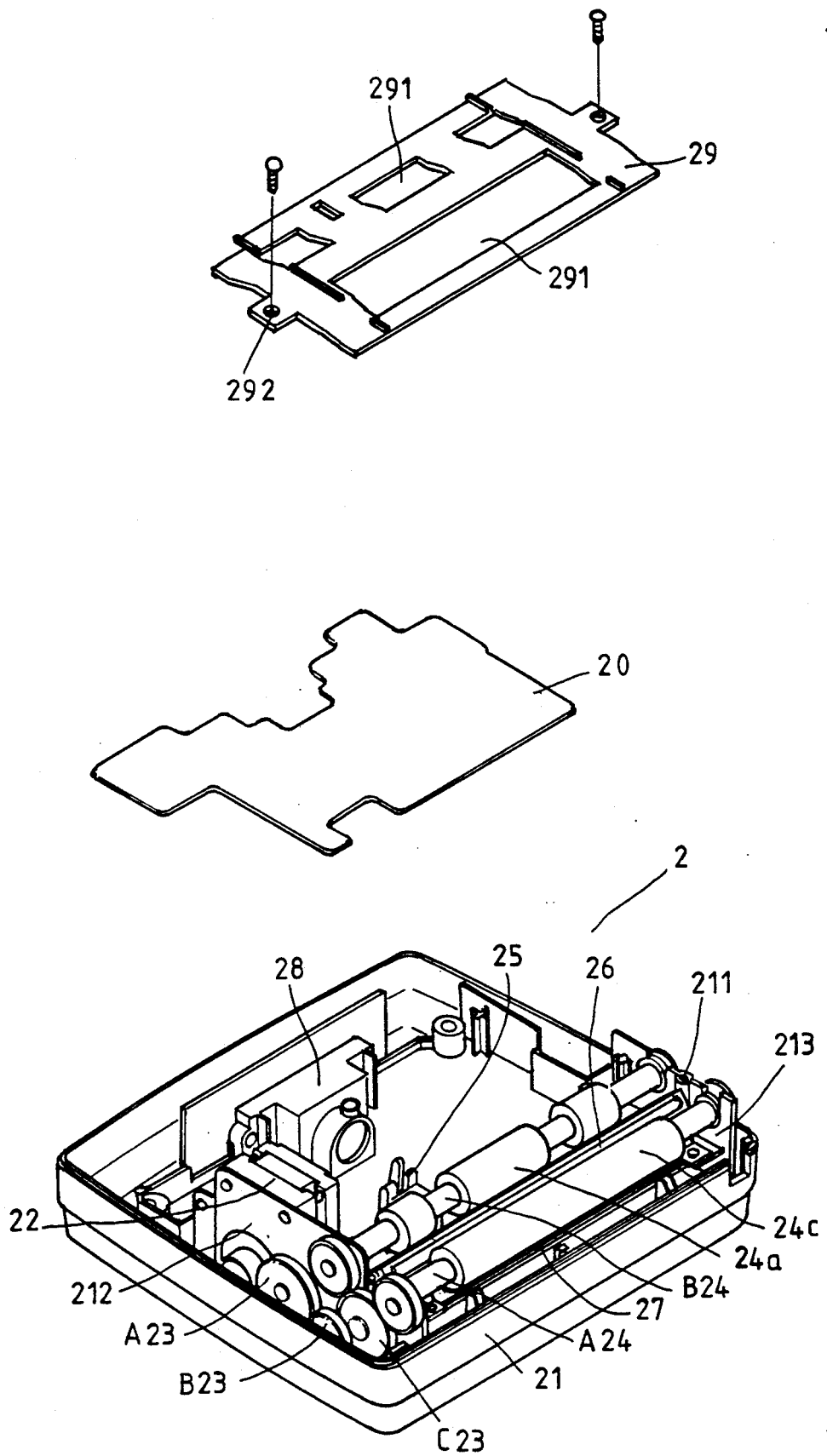
FIG. 2A is an exploded view of the bottom unit thereof.
Figure 2B:
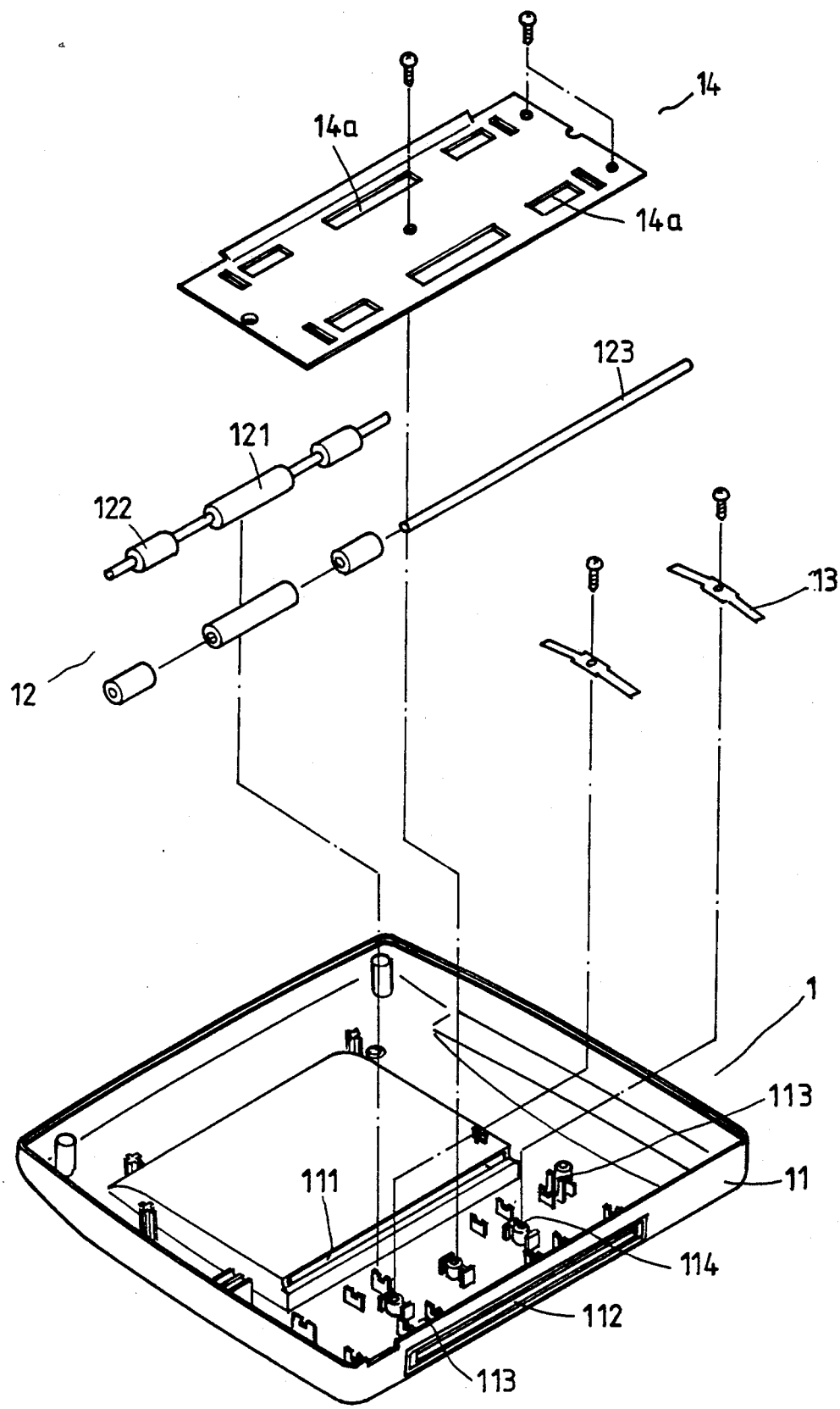
FIG. 2B is an exploded view of the upper unit thereof.
Figure 3:
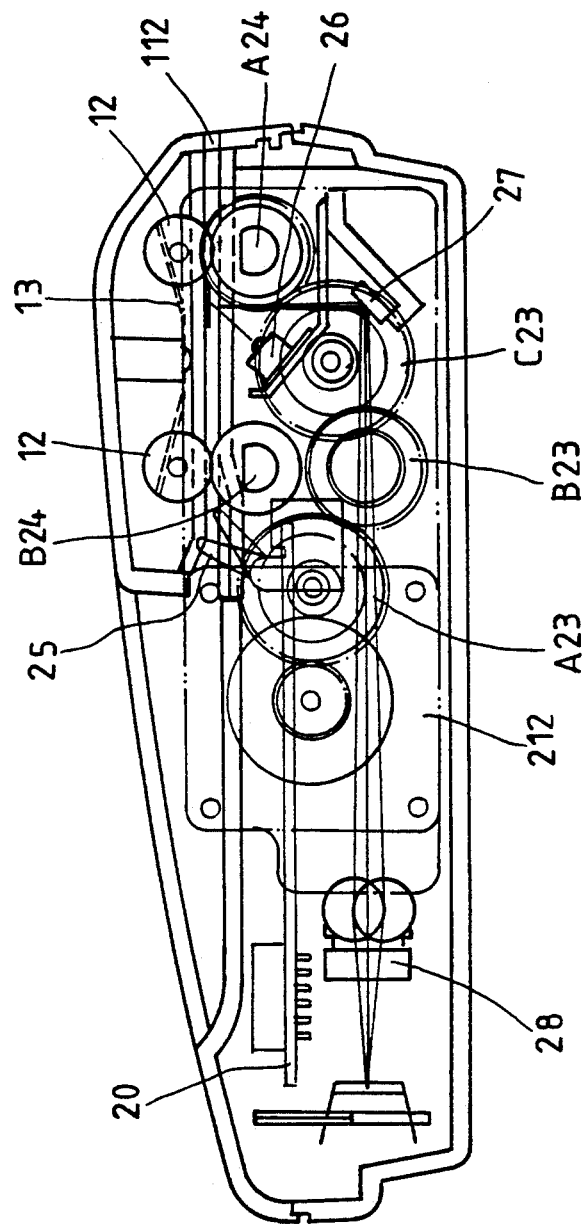
FIG. 3 is a plain side view of the scanner showing its internal arrangement.

Referring to FIGS. 1, 2 and 3, a scanner as constructed in accordance with the present invention is generally comprised of an upper unit 1 and a bottom unit 2.

The upper unit 1 is consisted of a cover shell 11 made from a plastic material through the process of injection molding, a document guide roller assembly 12, spring pressers 13, and a lid 14. The cover shell 11 has a document feed port 111, a document outlet port 112, a plurality of locating elements 113 to hold the document guide roller assembly 12, and a to plurality of internally threaded posts 114 to hold the spring pressers 13 and the lid 14 by screws. The document guide roller assembly 12 comprises two axles 123 retained to the locating elements 113 by the spring pressers 13 and covered by the lid 14, and rollers 121,122 protruded through openings 14a on the lid 14. When assembled, the spring pressers 13 have each two opposite ends respectively sloping downward and pressed on either axle 123.

The bottom unit 2 is comprised of a casing 21, a motor drive 22, a transmission gear set A23,B23,C23, a transmission roller assembly A24,B24, a spring switch 25, a LED light source 26, a reflector 27, a focus lens assembly 28, a cover board 29, and a control circuit board 20. The casing 21 has mounting boards 212,213 to which the motor drive 22 and the transmission gear set A23,B23,C23 and the transmission roller assembly A24,B24 are respectively fastened. The spring switch 25, LED light source 26, reflector 27, focus lens assembly 28 and control circuit board 20 form a scanning control circuit system. As the function of this scanning control circuit system is of the known art, it is not necessary to state in details. As a document (business card or the like) 4 was feed through the feed port 111 to trigger the spring switch 25, a time delay circuit of the control circuit board 20 gives a 1.43 seconds of time delay for the user to correct the position of the document 4, and then the control circuit board 20 gives a trigger signal at 2.8 ms to start the motor drive 22 in turning the transmission roller assembly A24,B24 via the transmission gear set A23,B23,C23, so as to further rotate the document guide roller assembly 12 in carrying the document 4 forward. The cover board 29 has screw holes 292 at two opposite ends respectively fastened to internally threaded posts 211 on the casing 21 by screws, and openings 291 through which the rollers 24a of the transmission roller assembly A24,B24 protrude.

Figure 4:
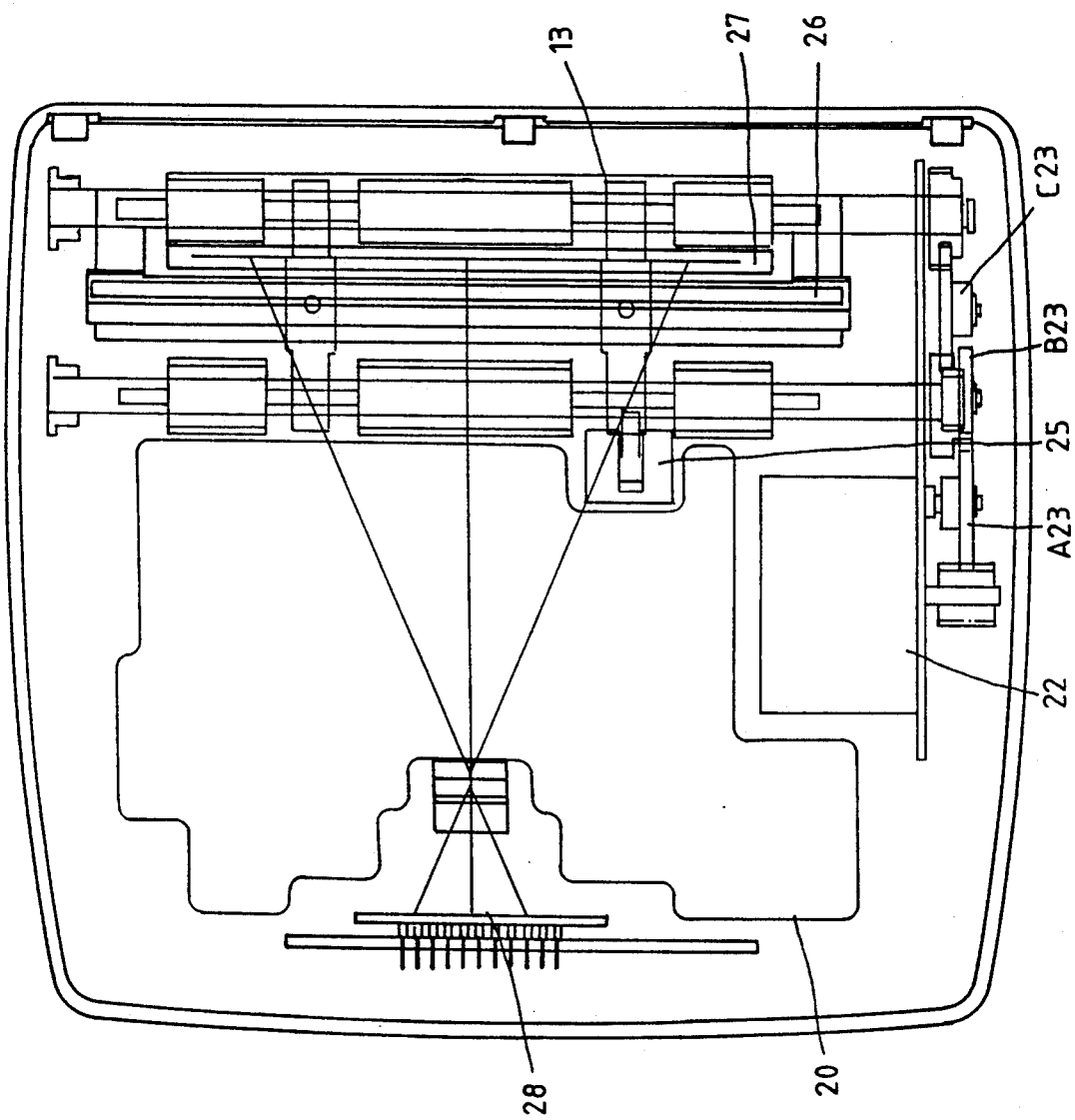
FIG. 4 is a plain top view of the scanner.

Referring to FIG. 4 and FIG. 3 again, as the spring switch 25 was triggered by the document 4 fed through the feed port 111, the control circuit board 20 gives a 1.43 seconds of time delay for the user to correct the position of the document and then gives a trigger signal at 2.8 ms to start the motor drive 22 in turning the transmission roller assembly A24,B24 via the transmission gear set A23,B23,C23, so as to further rotate the document guide roller assembly 12 in carrying the document 4 forward. As the document 4 is being delivered forward, the image of the document 4 projected by the LED light source 26 is reflected by the reflector 27 onto the focus lens assembly 28 for further processing. As the axles 123 of the document guide roller assembly 12 are pressed by the spring pressers 13, the document 4 is guided forward smoothly for high quality scanning. The arrangement of the spring pressers 13 also prevents the document 4 from being biased.

Figure 5:
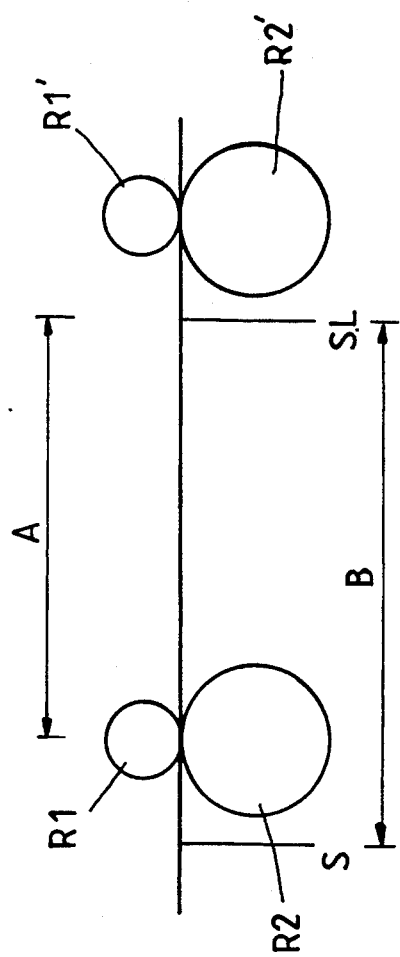
FIG. 5 is a motor start drive analytical chart according to the present invention.

Referring to FIG. 5, trigger signal TG/N is divided by 50. The number of steps B that the motor drive shall have to go from the sensor S to the scanline S.L. is 450, and the number of steps A that the motor drive shall have to go from the rollers R1,R2 to the scanline S.L. is 350, and therefore the greatest common divisor—50 is taken for the counter in counting operation.

I claim:

1. A scanner comprising:
    an upper unit consisting of a cover shell made through a molding process, a document guide roller assembly, two spring pressers, and a lid, said cover shell having a document feed port, a document outlet port, a plurality of locating elements to hold said document guide roller assembly, and a plurality of internally threaded posts to hold said spring pressers and said lid by screws, said document guide roller assembly comprising two axles retained to said locating elements by said spring pressers and covered by said lid, and rollers protruded through openings on said lid, each spring presser having two opposite ends respectively pressed on either axle at either end said ends formed into two opposite sloping strips respectively pressed on either axle of said document guide roller assembly to hold down said document guide roller assembly and prevent the inserted document from being biased; and a bottom unit comprised of a casing, a motor drive, a transmission gear set, a transmission roller assembly, a spring switch, a LED lightsource, a reflector, a focus lens assembly, a cover board, and a control circuit board, said casing having mounting boards to which said motor drive and transmission gear set and transmission roller assembly are respectively fastened, said spring switch, said LED light source, said reflector, said focus lens assembly and said control circuit being incorporated into a scanning control circuit system for scanning control, said cover board having screw holes at two opposite ends respectively fastened to internally threaded posts on said casing by screws, and openings through which rollers on said transmission roller assembly protrude.

2. The scanner of claim 1 wherein said LED light source comprises a plurality of light emitting diodes controlled to project light onto the document passing through said scanning control circuit system for permitting the image of the document to be reflected by said reflector onto said focus lens assembly.

* * * * *